United States Patent Office 3,402,224
Patented Sept. 17, 1968

3,402,224
DIACID ESTER DIMETHYL THIOETHER DIPHOSPHORUS COMPOUNDS
Hans-Gerd Schicke, Wuppertal-Elberfeld, Germany, assignor to Farbenfabriken Bayer Aktiengesellschaft, Leverkusen, Germany, a corporation of Germany
No Drawing. Filed Mar. 12, 1965, Ser. No. 439,442
Claims priority, application Germany, Mar. 24, 1964, F 42,403
13 Claims. (Cl. 260—929)

ABSTRACT OF THE DISCLOSURE

Organic phosphorus diacid ester dimethyl thioethers of the formula

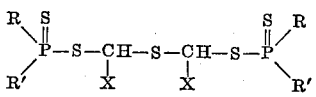

in which R and R' each respectively is alkyl, alkoxy, alkylamino, dialkylamino or phenyl, and X is lower carbalkoxy, aminocarbonyl, alkylaminocarbonyl, dialkylaminocarbonyl or cyano, which possess pesticidal properties, and which may be produced by conventional methods.

---

The present invention relates to thionothiol-phosphoric (-phosphonic, and -phosphinic) acid esters of the general formula

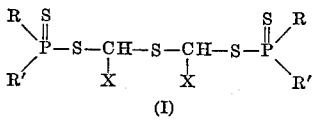

having outstanding insecticidal and acaricidal properties, as well as insecticidal and acaricidal formulations or compositions containing such acid esters, and methods for producing and for using the same. In the above formula, R and R' represent the same or different, preferably lower, alkyl, alkoxy, alkylamino, or dialkylamino groups or phenyl radicals; and X denotes a lower carbalkoxy, aminocarbonyl, alkylaminocarbonyl, dialkylaminocarbonyl or cyano group.

It is an object of the present invention to provide thionothiol-phosphoric acid esters, thionothiol-phosphonic acid esters, and thionothiol-phosphinic acid esters of the foregoing type which possess valuable properties rendering such acid esters useful as highly effective insecticidal and acaricidal agents.

It is another object of the present invention to provide pesticidal, for example insecticidal and acaricidal, preparations or formulations containing novel organic phosphorus diacid ester dimethyl thioethers, which possess highly effective pesticidal, especially insecticidal and acaricidal, properties with regard to use in connection with pest control, mainly in plant protection and in the field of hygiene.

It is another object of the present invention to provide particular organic phosphorus diacid ester dimethyl thioethers of the foregoing type which possess a comparatively low toxicity toward warm-blooded animals, yet which possess a good compatibility with respect to plants.

It is still another object of the present invention to provide compositions or formulations of such organic phosphorus diacid ester dimethyl thioethers with carrier vehicles, especially dispersible solid and liquid carrier vehicles.

It is still another object of the present invention to provide organic phosphorus diacid ester dimethyl thioethers of the foregoing type and compositions or formulations thereof with carrier vehicles, and/or with other known agriculturally beneficial, plant treating agents, for example plant protective agents, as pesticidal agents for the treatment of plants to guard against pest blight, etc., to which such plants may be susceptible.

It is a still further object of the present invention to provide a process for producing such organic phosphorus diacid ester dimethyl thioethers, and methods for using such thioethers, and more specifically methods for combatting pests such as insects and acarids, by applying to plants susceptible to damage by such pests, a pesticidally effective amount of such thioethers.

Other and further objects of the present invention will become apparent from the within specification and accompanying examples.

It has been found in accordance with the present invention that compounds of the above constitution are obtained in a smooth reaction and with very good yields, when α,α'-dihalo-dimethyl thioethers of the general formula

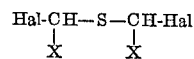

in which Hal represents a halogen atom and X has the foregoing meaning, are reacted with thionothiol-phosphoric (-phosphonic, -phosphinic) acids of the general formula

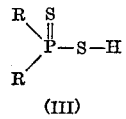

in which R and R' have the foregoing meaning, either in the form of their alkali metal salts, such as sodium, potassium, and lithium salts, or ammonium salts, or in the presence of acid-binding agents. Alkali metal carbonates or alcoholates, such as sodium, potassium, and lithium-carbonates or -alcoholates, including especially alkylolates, and particuarly $C_1$-$C_6$ lower alkanolates, are primarily suitable as acid-binding agents.

The process of the present invention proceeds according to the following equation:

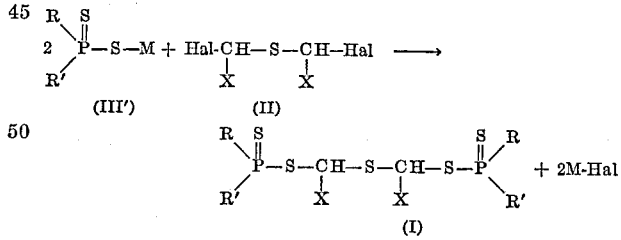

In the last-mentioned formulae, the symbols R, R' and X have the meaning given above, while Hal represents a halogen atom, and M represents an alkali metal such as sodium, potassium or lithium, or the ammonium group.

The reaction according to the present invention is preferably carried out in the presence of inert organic media such as solvents or diluents. Lower aliphatic ketones, and especially di-$C_1$-$C_4$ alkyl ketones, such as acetone, methyl ethyl ketone, methyl isopropyl ketone and methyl isobutyl ketone as well as lower aliphatic nitriles and especially $C_1$-$C_4$ alkane cyanides, e.g., aceto and propionitrile, have chiefly proved satisfactory for this purpose.

Furthermore, it is expedient to carry out the reaction at room temperature or moderately elevated temperature (for example substantially from about 20 to 100° C.), preferably at the boiling temperature of the mixture and, after combining the starting components, to continue heating the reaction mixture for some time (for example substantially from about 1 to 3 hours), while stirring.

The α,α'-dihalo-dimethyl thioethers required as starting materials, which are not yet known from the literature, can be prepared according to methods known in principle, by halogenation, especially chlorination or bromination, of the corresponding dicarbalkoxy- (especially di-$C_1$-$C_4$ lower carbalkoxy-, i.e., dicarbo-$C_1$-$C_4$ lower alkoxy-) dicarbonamido-, dicarbo-N-alkylamido-(especially dicarbo-N-$C_1$-$C_4$ lower alkyl amido-), dicarbo N,N-dialkylamido- (especially dicarbo-N,N-di-$C_1$-$C_4$ lower alkyl amido-) or dicyanodimethyl thioethers, preferably in an inert organic solvent such as an aromatic hydrocarbon, especially a mononuclear aryl hydrocarbon having 6 ring carbon atoms e.g. benzenes, or a chlorinated hydrocarbon, especially a chlorinated aliphatic hydrocarbo, e.g. methylene chloride, tri- and tetrachloroethylene, chlorform, carbon tetrachloride, tri- and tetrachloroethane, etc. The reaction is preferably carried out at the boiling temperature of the reaction mixture which is subssequently further heated for about one hour. The products are usually colorless oils which can be distilled in a vacuum.

The thionothiol-phosphoric (-phosphonic, -phosphinic) acid esters produced therefrom according to the present invention are mostly obtained in the form of an oil well, but in general, such acid esters cannot be distilled without decomposition, even under strongly reduced pressure. Nevertheless, the acid esters can be freed from the last volatile components by prolonged heating at about 50 to 60° C. in a vacuum, and can thus be purified.

The products of the present invention are distinguished by an outstanding insecticidal and acaricidal activity. Moreover, they possess, surprisingly and in contradistinction to known compounds of analogous constitution, only a comparatively low toxicity towards warm-blooded animals. Thus, the instant organic phosphorous diacid ester dimethyl thioethers, i.e., thionothiol-phosphoric acid esters, thionothiol-phosphonic acid esters, and thiono-phosphinic acid eesters of the foregoing type, may be used to combat insect pests, such as the insects: beetles, bugs, aphids, flies, mosquitoes, caterpillars, cockroaches as well as the acarids, mites and ticks.

The compounds which can be produced according to the present invention are therefore used as pest control agents, mainly in plant protection, and in the field of hygiene, for example to combat insects and acarids.

The following examples are given for the purpose of illustrating while not limiting, the present invention.

EXAMPLE 1

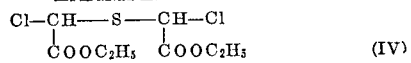
(IV)

(a) 206 grams (1 mol) of α,α'-dicarbethoxy-dimethyl thioether are dissolved in 400 cc. of methylene chloride. This solution is mixed dropwise with 270 g. of sulfuryl chloride, the reaction mixture is heated at boiling temperature for a further hour after the reaction is completed, then washed with water until the reaction is neutral, and the organic phase is dried and fractionally distilled. After evaporation of the solvent, the α,α(-di- chloro-α,α--dicarbethoxy-dimethyl thioether distills over under a pressure of 2 mm. Hg at 146 to 148° C. The compound has the refractive index $n_D^{24}$ 1.4865. The yield amount to 215 g. (78% of the theoretical).

*Analysis.*—Calculated for a molecular weight of 275: S, 11.64%; Cl, 2.58%. Found: S, 12.06%; Cl, 25.73%.

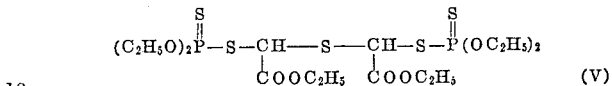
(V)

(b) 55 grams of α,α'-dichloro-α,α'-dicarbethoxy-dimethyl thioether dissolved in 100 cc. of acetonitrile are added dropwise at boiling temperature to a solution of 81 g. (0.4 mol) of the ammonium salt of O,O-diethylthionithiol-phosphoric acid in 600 cc. of acetonitrile. The reaction mixture is subsequently further heated at boiling temperature for one hour to complete the reaction and, after cooling to 20° C, poured into 2 litres of water. The separated oil is taken up with methylene chloride, the methylene chloride solution is dried and the solvent distilled off. The residue is finally freed from the last volatile components at a bath temperature of 50 to 60° C. under strongly reduced pressure. The yield amounts to 110 g. (96% of the theoretical). The α,α'-bis-(O,O-diethyl-thionothiol-phosphoryl)-α,α'-dicarbethoxy-dimethyl thioether has the refractive index $n_D^{24}$ 1.5256.

*Analysis.*—Calculated for a molecular weight of 574: P, 10.8%; S, 27.90%. Found: P, 10.8%; S, 28.48%.

On rats per os the product has a mean toxicity (DL$_{50}$) of 250 mg. per kg. animal weight.

EXAMPLE 2

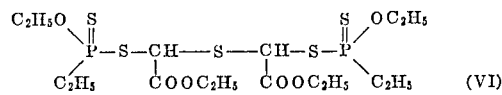
(VI)

83 grams (0.4 mol) of the potassium salt of ethyl-O-ethyl-thionothiol-phosphonic acid are dissolved in 600 cc. of acetonitrile, and 55 g. of α,α'-dichloro-α,α'-dicarbethoxydimethyl thioether dissolved in 100 cc. of acetonitrile are added dropwise to this solution at boiling temperature. The reaction mixture is subsequently heated at this temperature for a further hour, then cooled and poured into about 2 litres of water. The separated oil is taken up in methylene chloride, the methylene chloride solution then dried and the solvent distilled off. The residue is freed from volatile components in a vacuum. The yield of α,α'-bis-(ethyl-O-ethyl-thionothiol-phosphonyl)-α,α'-dicarbethoxy-dimethyl thioether amounts to 102 g. (94% of the theoretical). The product has the refractive index $n_D^{24}$ 1.5433.

*Analysis.*—Calcuated for a molecular weight of 542: P, 11.42%; S, 29.55%. Found: P, 11.62%; S, 28.78%.

On rats per os the mean toxicity (DL$_{50}$) of the compound is 50 mg. per kg. animal weight.

The following compounds [α,α'-bis-(methyl-O-ethyl-thionothiol-phosphonyl)-α,α'-dicarbethoxy-dimethyl thioether (VII) and α,α'-bis(phenyl-O-ethyl-thionothiol-phosphonyl)-α,α'-dicarbethoxy-dimethyl thioether (VIII)] can be produced in an analogous manner:

| | Constitution | Refractive index [$n_D^{24}$] | Toxicity towards warm-blooded animals (DL$_{50}$) on rats per os in mg./kg. |
|---|---|---|---|
| (VII) | 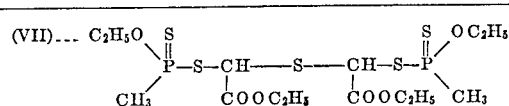 | 1.5402 | 50 |
| (VIII) | 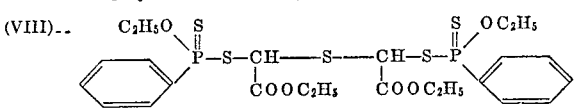 | 1.5864 | [1] 1,000 |

[1] No symptoms.

EXAMPLE 3

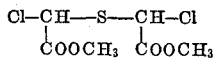 (IX)

(a) 540 grams of sulfuryl chloride dissolved in 500 cc. of methylene chloride are added dropwise to a solution of 356 g. (2 mols) of α,α'-dicarbomethoxy-dimethyl thioether in 1000 cc. of methylene chloride. When the addition is completed, the reaction mixture is heated at boiling temperature for a further hour and then fractionally distilled. 430 grams (76.5% of the theoretical) of α,α'-dichloro-α,α'-dicarbomethoxy-dimethyl thioether of B.P. 140° C./2 mm. Hg are obtained.

*Analysis.*—Calculated for a molecular weight of 247: S, 12.96%. Found: S, 13.44%.

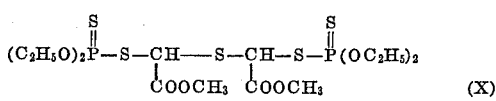 (X)

(b) 61 grams (0.3 mol) of the ammonium salt of O,O-diethyl-thionothiol-phosphoric acid are dissolved in 350 cc. of acetonitrile. 37 grams of α,α'-dichloro-α,α'-dicarbomethoxy-dimethyl thioether are then added dropwise to this solution at boiling temperature. After stirring at the stated temperature for one hour, the reaction mixture is cooled and poured into water. The separated oil is taken up with methylene chloride, the methylene chloride solution is dried and the solvent distilled off. The residue is freed from volatile components in a vacuum. The yield of α,α'-bis-(O,O-diethyl-thionothiol-phosphoryl)-α,α'-dicarbomethoxy-dimethyl thioether amounts to 80 g. (97.5% of the theoretical), the refractive index $n_D^{25}$ is 1.5320.

*Analysis.*—Calculated for a molecular weight of 546: P, 11.32%; S, 29.3%. Found: P, 11.34%; S, 29.21%.

On rats per os the compound has a mean toxocity ($DL_{50}$) of 100 mg. per kg. animal weight.

The compound α,α'-bis-(ethyl-O-ethyl-thionothiolphosphonyl)-α,α'-dicarbomethoxy-dimethyl thioether of the following constitution

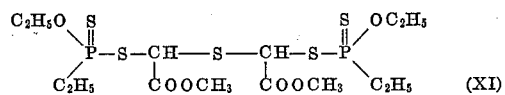 (XI)

can be obtained under analogous reaction conditions. The product has the refractive index $n_D^{25}$ 1.5528 and a mean toxicity on rats per os of 50 mg. per kg. animal weight.

It may be seen from the foregoing that the various organic phosphorus diacid ester dimethyl thioethers of the present invention may be used per se or in the form of compositions or formulations with dispersible carrier vehicles to combat various pests, such as insects and acarids. The compounds and formulations in question give outstanding insecticidal and acaricidal effects. The compounds in question may be used in such formulations with carrier vehicles in pesticidally, and more especially insecticidally or acaricidally, effective amounts, and such amounts may be generally between about 0.1–95% by weight of the mixture with the carrier vehicle.

The compounds which may be used according to the present invention can be utilized, if desired, in the form of the usual formulations with dispersible carrier vehicles, such as solutions, emulsions, emulsifiable concentrates, suspensions, spray powder, pastes, granulates, soluble powders, dusting agents, etc., and the like. These are prepared in known manner, for example, by extending the active agents with dispersible carrier vehicles such as solvents and/or solid carriers, optionally with the use of emulsifying agents and/or dispersing agents (cf. Agricultural Chemicals, March 1960, pages 35–38). The following can be chiefly considered as carrier vehicles or adjuvants for this purpose: solvents, such as aromatic hydrocarbons (for example, toluene, xylene or benzene, etc.), chlorinated aromatic hydrocarbons (for example, chlorobenzenes), paraffins (for example, petroleum fractions), alcohols (for example, methanol, propanol or butanol, etc.), amines (for example, ethanolamine), dimethyl-formamide, and water; finely divided solid carriers, such as natural ground minerals (for example, kaolins, alumina, talc and chalk) and synthetic ground minerals (for example, highly dispersed silicic acid and silicates, e.g., alkali silicates, etc.); emulsifying agents, such as nonionic and anionic emulsifying agents (for example, polyethylene oxide esters of fatty acids, polyethylene oxide ethers of fatty alcohols, alkyl sulfonates and aryl sulfonates, especially magnesium stearate, sodium oleate, etc.); and dispersing agents, such as lignin, spent sulphite liquors and methyl cellulose, etc.

Generally, the organic phosphorus diacid ester dimethyl thioethers of the type contemplated herein, i.e., the thionothiol-phosphoric acid esters, thionothiol-phosphonic acid esters and the thionothiol-phosphinic acid esters, may be used in the form of their formulations with carrier vehicles and/or other active agents, or in the form of particular dosages for specific application, etc., such as in the physical form of powders, granulates, solutions, emulsions, or suspensions. The application of the active pesticidal agent is carried out in the usual manner, for example by spraying, atomizing, dusting, watering, etc. As examples for the special utility the following inventive compounds have been tested with regard to their effectiveness against spider mites, caterpillars and aphids.

EXAMPLE A

Tetranychus test

Solvent: 3 parts by weight of acetone

Emulsifier: 1 part by weight of alkylaryloxypolyglycol ether

To produce a suitable preparation of active compound, 1 part by weight of the active compound is mixed with the stated amount of solvent containing the stated amount of emulsifier and the concentrate so obtained is diluted with water to the desired concentration.

Bush beans (*Phaseolus vulgaris*), which have a height approximately 10–30 cm., are sprayed with the preparation of the active compound until dripping wet. The bush beans are heavily infested with spider mites (*Tetranychus telarius*) in all stages of development.

After 48 hours the effectiveness of the preparation of active compound is determined by counting the dead mites. The degree of destruction thus obtained is expressed as a percentage: 100% means that all the spider mites are killed whereas 0% means none are killed.

The active compounds, their concentrations, and the results obtained can be seen from the following Table 1:

TABLE 1

| Compound No. | Active Agent (Constitution) | Concentration of active agent in percent | Degree of destruction of pests in percent |
|---|---|---|---|
| (V) | $(C_2H_5O)_2\overset{S}{\underset{\|}{P}}-S-\underset{\underset{COOC_2H_5}{\|}}{CH}-S-\underset{\underset{COOC_2H_5}{\|}}{CH}-S-\overset{S}{\underset{\|}{P}}(OC_2H_5)_2$ | 0.001 | 100 |
| (VI) | $\underset{C_2H_5}{\overset{C_2H_5O}{\diagdown}}\overset{S}{\underset{\|}{P}}-S-\underset{\underset{COOC_2H_5}{\|}}{CH}-S-\underset{\underset{COOC_2H_5}{\|}}{CH}-S-\overset{S}{\underset{\|}{P}}\underset{C_2H_5}{\overset{OC_2H_5}{\diagup}}$ | 0.001 | 100 |
| (VII) | $\underset{CH_3}{\overset{C_2H_5O}{\diagdown}}\overset{S}{\underset{\|}{P}}-S-\underset{\underset{COOC_2H_5}{\|}}{CH}-S-\underset{\underset{COOC_2H_5}{\|}}{CH}-S-\overset{S}{\underset{\|}{P}}\underset{CH_3}{\overset{OC_2H_5}{\diagup}}$ | 0.001 | 100 |

EXAMPLE B

Plutella test

Solvent: 3 parts by weight of acetone

Emulsifier: 1 part by weight of alkylaryloxypolyglycol ether

To produce a suitable preparation of active compound, 1 part by weight of the active compound is mixed with the stated amount of solvent containing the stated amount of emulsifier and the concentrate is diluted with water to the desired concentration.

Cabbage leaves (*Brassica oleracea*) are sprayed with the preparation of the active compound until dew moist and are then infested with caterpillars of the diamondback moth (*Plutella maculipennis*).

After 4 days the degree of destruction is determined as a percentage: 100% means that all the caterpillars are killed whereas 0% means that none are killed.

The active compounds, their concentrations, and the results obtained can be seen from the following Table 2:

TABLE 2

| Compound No. | Active Agent (Constitution) | Concentration of active agent in percent | Degree of destruction of pests in percent |
|---|---|---|---|
| (VII) | $\underset{CH_3}{\overset{C_2H_5O}{\diagdown}}\overset{S}{\underset{\|}{P}}-S-\underset{\underset{COOC_2H_5}{\|}}{CH}-S-\underset{\underset{COOC_2H_5}{\|}}{CH}-S-\overset{S}{\underset{\|}{P}}\underset{CH_3}{\overset{OC_2H_5}{\diagup}}$ | 0.001 | 70 |
| (XI) | $\underset{C_2H_5}{\overset{C_2H_5O}{\diagdown}}\overset{S}{\underset{\|}{P}}-S-\underset{\underset{COOCH_3}{\|}}{CH}-S-\underset{\underset{COOCH_3}{\|}}{CH}-S-\overset{S}{\underset{\|}{P}}\underset{C_2H_5}{\overset{OC_2H_5}{\diagup}}$ | 0.001 | 70 |

EXAMPLE C

Doralis test (contact action)

Solvent: 3 parts by weight of acetone

Emulsifier: 1 part by weight of alkylaryloxypolyglycol ether

To produce a suitable preparation of active compound, 1 part by weight of the active compound is mixed with the stated amount of solvent containing the stated amount of emulsifier and the concentrate is diluted to the desired concentration.

Bush bean plants (*Vicia faba*) which have been heavily infested with black bush bean aphids (*Doralis fabae*) are sprayed with the preparation of the active compound until dripping wet.

After 24 hours the degree of destruction is determined as a percentage: 100% means that all the aphids are killed whereas 0% means that none are killed.

The active compounds, their concentrations, and the results obtained can be seen from the following Table 3:

TABLE 3

| Compound No. | Active Agent (Constitution) | Concentration of active agent in percent | Degree of destruction of pests in percent |
|---|---|---|---|
| (X) | $(C_2H_5O)_2\overset{S}{\underset{\|}{P}}-S-\underset{\underset{COOCH_3}{\|}}{CH}-S-\underset{\underset{COOCH_3}{\|}}{CH}-S-\overset{S}{\underset{\|}{P}}(OC_2H_5)_2$ | 0.01 | 100 |
| (XI) | $\underset{C_2H_5}{\overset{C_2H_5O}{\diagdown}}\overset{S}{\underset{\|}{P}}-S-\underset{\underset{COOCH_3}{\|}}{CH}-S-\underset{\underset{COOCH_3}{\|}}{CH}-S-\overset{S}{\underset{\|}{P}}\underset{C_2H_5}{\overset{OC_2H_5}{\diagup}}$ | 0.004 | 95 |

Preferably, as used herein, both the specification and claims, the symbols R and R' each include as the case may be, lower alkyl groups, preferably $C_1$–$C_4$ alkyl groups or lower alkoxy groups, preferably $C_1$–$C_4$ alkoxy groups such as methyl, ethyl, n-propyl, isopropyl, n-butyl, isobutyl, sec.-butyl, tert.-butyl, and the like as well as methoxy, ethoxy, n-propoxy, isopropoxy, n-butoxy, isobutoxy, sec.-butoxy, tert.-butoxy, and the like, as well as the phenyl group.

In the same way, X as used herein, both in the specification and claims, includes especially lower carboalkoxy, such as $C_1$–$C_4$ lower carboalkoxy, i.e., carbo $C_1$–$C_4$ lower alkoxy, such as carbomethoxy, carboethoxy, carbo-n-propoxy, carboisopropoxy, carbo-n-butoxy, carbo-isobutoxy, carbo-sec.-butoxy, and carbo-tert.-butoxy.

Especially contemplated herein are those thioethers in which X is lower carboalkoxy, and in which R and R' are both alkoxy, or in which R is alkoxy and R' is alkyl, or in which R is alkoxy and R' is phenyl. More specifically, α,α' - bis(O,O - diloweralkyl - thionothiol - phosphoryl)-α,α'-dilower carboalkoxy-dimethyl thioethers having the formula

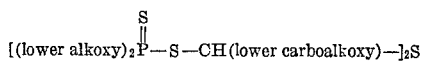

and α,α'-bis-(lower alkyl-O-lower alkyl-thionothiol-phosphonyl)-α,α'-dilower carboalkoxy-dimethyl thioethers having the formula

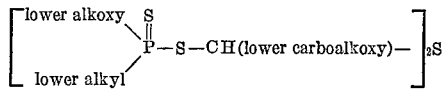

as well as α,α'-bis-(phenyl-O-lower alkyl-thionothiol-phosphonyl-α,α'-dilower carboalkoxy-dimethyl thioethers having the formula

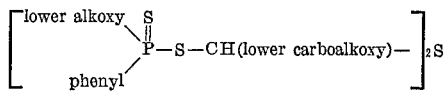

have been found to be most effective as pesticidal agents. These preferably contemplate the $C_1$–$C_4$-lower alkyl or -lower alkoxy or -lower carboalkoxy groups.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Organic phosphorus diacid ester dimethyl thioethers of the formula

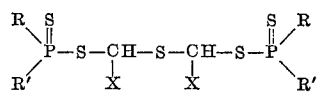

in which R and R' each respectively represents a member selected from the group consisting of lower alkyl, lower alkoxy, and phenyl, and X represents lower carboalkoxy.

2. Thioethers according to claim 1 wherein X is $C_1$–$C_4$ lower carboalkoxy, and R and R' are $C_1$–$C_4$ alkoxy.

3. Thioethers according to claim 1 wherein X is $C_1$–$C_4$ lower carboalkoxy, R is $C_1$–$C_4$ alkoxy, and R' is $C_1$–$C_4$ alkyl.

4. Thioethers according to claim 1 wherein X is $C_1$–$C_4$ lower carboalkoxy, R is $C_1$–$C_4$ alkoxy, and R' is phenyl.

5. α,α'-Bis-(O,O-diloweralkyl-thionothiol-phosphoryl)-α,α'-dilowercarboalkoxy-dimethyl thioether having the formula

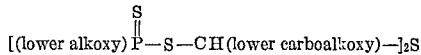

6. α,α'-Bis-(lower alkyl-O-loweralkyl-thionothiolphosphonyl)-α,α'-dilowercarboalkoxy-dimethyl thioether having the formula

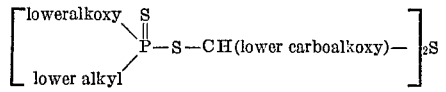

7. α,α' - Bis-(phenyl-O-loweralkyl-thionothiolphosphonyl)-α,α'-dilowercarboalkoxy-dimethyl thioether having the formula

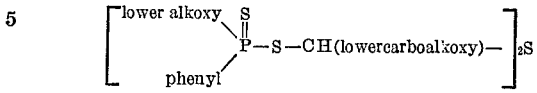

8. α,α' - Bis-(O,O-diethyl-thionothiol-phosphoryl)-α,α'-dicarboethoxy-dimethyl thioether having the formula

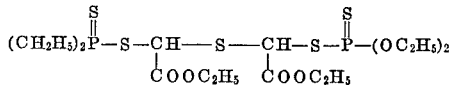

9. α,α'Bis-(ethyl-O-ethyl-thionothiol-phosphonyl)-α,α'-dicarboethoxy-dimethyl thioether having the formula

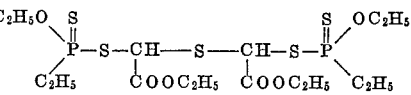

10. α,α' - Bis-(methyl-O-ethyl-thionothiol-phosphonyl)-α,α'-dicarboethoxy-dimethyl thioether having the formula

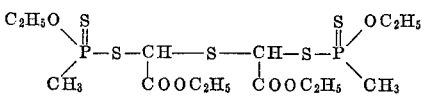

11. α,α' - Bis-(phenyl-O-ethyl-thionothiol-phosphonyl)-α,α'-dicarboethoxy-dimethyl thioether having the formula

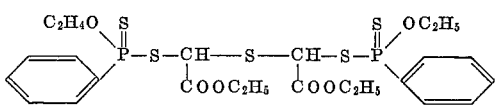

12. α,α'-Bis-(O,O-diethyl-thionothiol-phosphoryl)-α,α'-dicarbomethoxy-dimethyl thioether having the formula

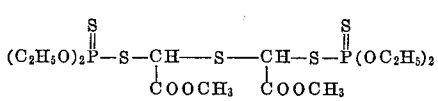

13. α,α' - Bis - (ethyl-O-ethyl-thionothiol-phosphonyl)-α,α'dicarbomethoxy-dimethyl thioether having the formula

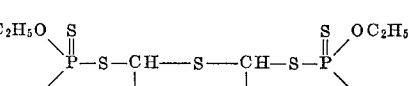

References Cited
UNITED STATES PATENTS 3,018,301  1/1962  Schrader _____ 260—929

CHARLES B. PARKER, *Primary Examiner.*

A. H. SUTTO, *Assistant Examiner.*

UNITED STATES PATENT OFFICE
CERTIFICATE OF CORRECTION

Patent No. 3,402,224            September 17, 1968

Hans-Gerd Schicke

It is certified that error appears in the above identified patent and that said Letters Patent are hereby corrected as shown below:

Column 2, lines 30 to 34, formula III should appear as shown below:

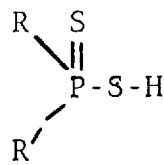

Column 3, line 12, "dicyanodimethyl" should read -- dicyano--dimethyl --; line 25, before "well" insert -- as --; line 60, "α,α(-di-" should read -- α,α′-di- --. Column 4, line 1, "chloro-α-α-dicarbethoxy-dimethyl thioether" should read -- chloro-α-α′-dicarbethoxy-dimethyl thioether --; line 5, "Cl, 2.58%" should read -- Cl, 25.8% --; line 15, "thionithiol-phosphoric" should read -- thionothiol-phosphoric --. Column 9, lines 51 to 53, the formula should appear as shown below:

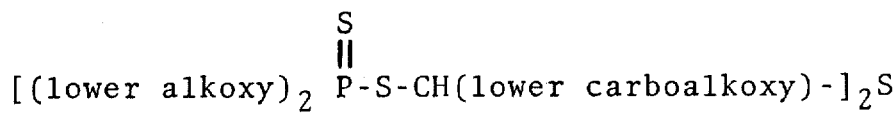

Column 10, lines 11 to 14, the formula should appear as shown below:

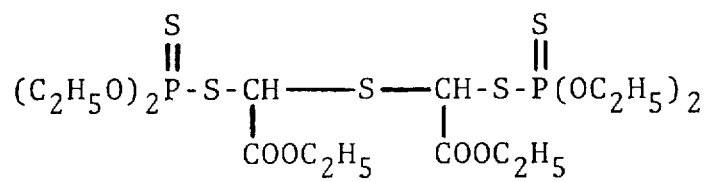

3,402,224

(2)

same column 10, lines 33 to 37, the left-hand portion of the formula should appear as shown below:

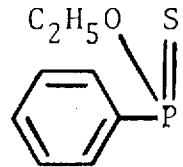

Signed and sealed this 10th day of March 1970.

(SEAL)
Attest:

EDWARD M. FLETCHER, JR.
Attesting Officer

WILLIAM E. SCHUYLER, JR.
Commissioner of Patents